(12) United States Patent
Koehler et al.

(10) Patent No.: US 9,470,213 B2
(45) Date of Patent: Oct. 18, 2016

(54) HEAT-ACTUATED RELEASE MECHANISM

(71) Applicant: Raytheon Company, Waltham, MA (US)

(72) Inventors: Frederick B Koehler, Tucson, AZ (US); Ward D Lyman, Tucson, AZ (US); Douglas M Beard, Tucson, AZ (US); Anthony O Lee, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 647 days.

(21) Appl. No.: 13/652,552

(22) Filed: Oct. 16, 2012

(65) Prior Publication Data

US 2014/0102090 A1    Apr. 17, 2014

(51) Int. Cl.
*F03G 7/06* (2006.01)
*F16B 1/00* (2006.01)

(52) U.S. Cl.
CPC ............. *F03G 7/065* (2013.01); *F16B 1/0014* (2013.01)

(58) Field of Classification Search
CPC .......... F01B 29/10; H01H 85/02; F03G 7/06
See application file for complete search history.

(56) References Cited

U.S. PATENT DOCUMENTS

| | | | |
|---|---|---|---|
| 4,551,975 A * | 11/1985 | Yamamoto | B25J 9/1085 60/528 |
| 4,716,731 A | 1/1988 | Sakai et al. | |
| 4,899,543 A | 2/1990 | Romanelli et al. | |
| 4,945,727 A | 8/1990 | Whitehead et al. | |
| 5,022,690 A * | 6/1991 | Coltrin | E05B 63/121 292/21 |
| 5,061,914 A | 10/1991 | Busch et al. | |
| 5,105,178 A | 4/1992 | Krumme | |
| 5,119,555 A | 6/1992 | Johnson | |

(Continued)

FOREIGN PATENT DOCUMENTS

| | | |
|---|---|---|
| EP | 2 341 522 A1 | 7/2011 |
| JP | 62-139583 U | 9/1987 |

(Continued)

OTHER PUBLICATIONS

International Search Report and Written Opinion for corresponding International Application No. PCT/US2013/034908 mailed Jul. 10, 2013.

(Continued)

*Primary Examiner* — Thomas Denion
*Assistant Examiner* — Shafiq Mian
(74) *Attorney, Agent, or Firm* — Renner, Otto, Boisselle & Sklar, LLP

(57) ABSTRACT

A release mechanism passively releases a mechanical coupling as a result of a temperature rise. The release mechanism includes a breakable element, such as a shape memory alloy (SMA) element, that is configured to break when the element is heated to a predetermined temperature. The breakage of the breakable element releases a mechanical coupling, such as a coupling holding a lid onto a container. The release mechanism may be part of a handle or other device to close the container. The release mechanism may have a mechanical load on it prior to release, a load that in part passes through the breakable element. Most of the load may pass through one or more other members of the release mechanism, providing the force for separation after the release mechanism is triggered. The release mechanism may be used to provide a passive way of releasing a mechanical coupling in response to heating.

20 Claims, 2 Drawing Sheets

(56) References Cited

U.S. PATENT DOCUMENTS

| | | | | |
|---|---|---|---|---|
| 5,129,753 | A * | 7/1992 | Wesley | B64G 1/222 403/322.3 |
| 5,245,738 | A | 9/1993 | Johnson | |
| 5,722,709 | A | 3/1998 | Lortz et al. | |
| 6,126,371 | A | 10/2000 | McCloskey | |
| 6,390,878 | B1 * | 5/2002 | Zhou | A63H 17/26 446/14 |
| 7,334,656 | B2 * | 2/2008 | Kramarczyk | B60R 21/38 180/274 |
| 7,396,182 | B2 | 7/2008 | Retat et al. | |
| 7,688,168 | B2 * | 3/2010 | Taya | F04B 9/06 310/26 |
| 8,056,335 | B1 * | 11/2011 | Brown | F03G 7/065 60/528 |
| 8,876,062 | B1 * | 11/2014 | Baghdasarian | B64G 1/222 16/231 |
| 2002/0113106 | A1 * | 8/2002 | Cheney | 224/404 |
| 2002/0135196 | A1 * | 9/2002 | Bingle et al. | 296/76 |
| 2005/0136270 | A1 | 6/2005 | Besnoin et al. | |
| 2006/0012191 | A1 * | 1/2006 | Brei | E05B 47/0009 292/341.17 |
| 2007/0210103 | A1 * | 9/2007 | Bosshardt | 222/106 |
| 2007/0296257 | A1 * | 12/2007 | Nathan et al. | 297/325 |
| 2008/0034750 | A1 | 2/2008 | Gao et al. | |
| 2010/0139264 | A1 | 6/2010 | Lyman et al. | |
| 2011/0232278 | A1 | 9/2011 | Lyman et al. | |
| 2011/0232562 | A1 | 9/2011 | Koehler et al. | |
| 2011/0234362 | A1 | 9/2011 | Koehler et al. | |
| 2012/0187144 | A1 * | 7/2012 | Weber | G07F 11/62 221/124 |
| 2013/0221763 | A1 * | 8/2013 | Pinto, IV | E05B 65/00 307/328 |
| 2014/0096516 | A1 * | 4/2014 | Browne | F03G 7/06 60/528 |
| 2015/0084353 | A1 * | 3/2015 | Koehler | E05B 47/0009 292/336.3 |

FOREIGN PATENT DOCUMENTS

| | | |
|---|---|---|
| JP | 2005-247222 A | 9/2005 |
| JP | 2006316830 A | 11/2006 |
| WO | 2010068266 A1 | 6/2010 |

OTHER PUBLICATIONS

Japanese Office Action and English translation for corresponding application No. 2015-537689 dated May 18, 2016.

* cited by examiner

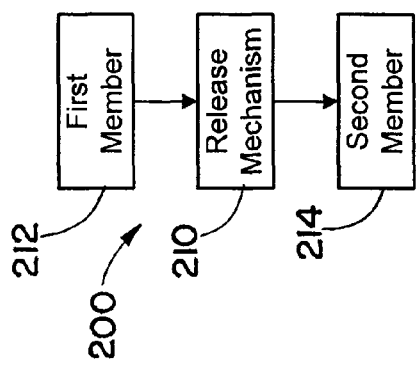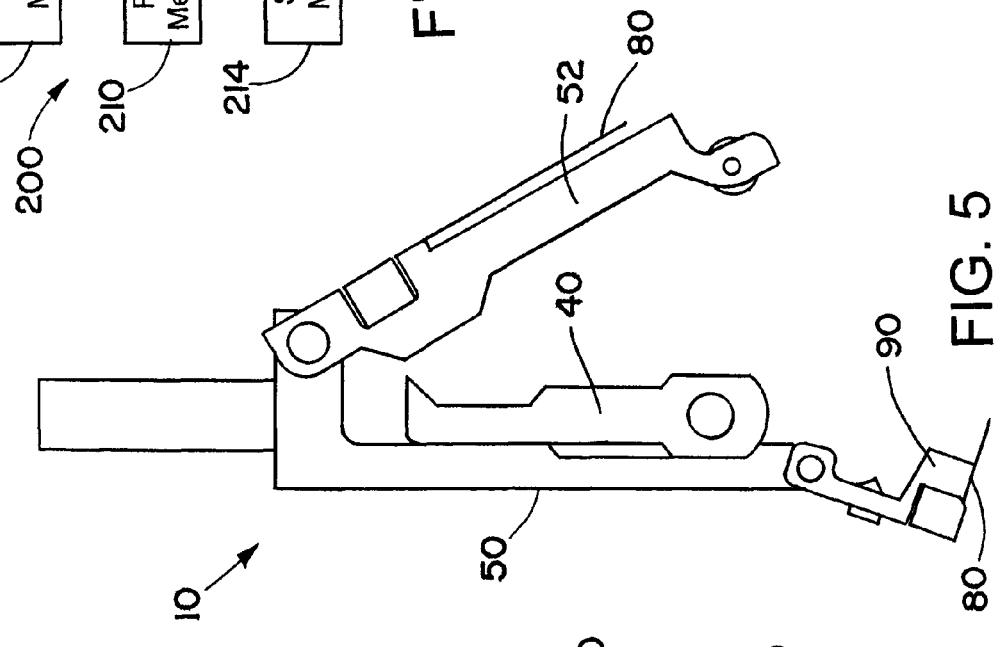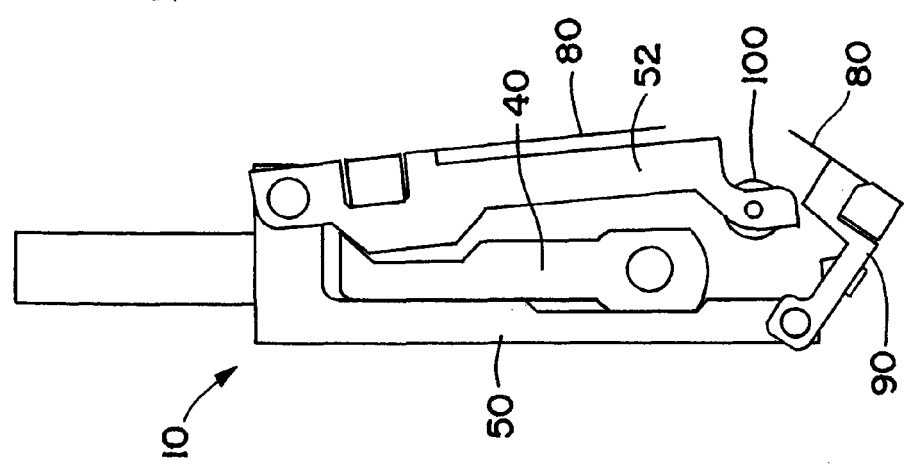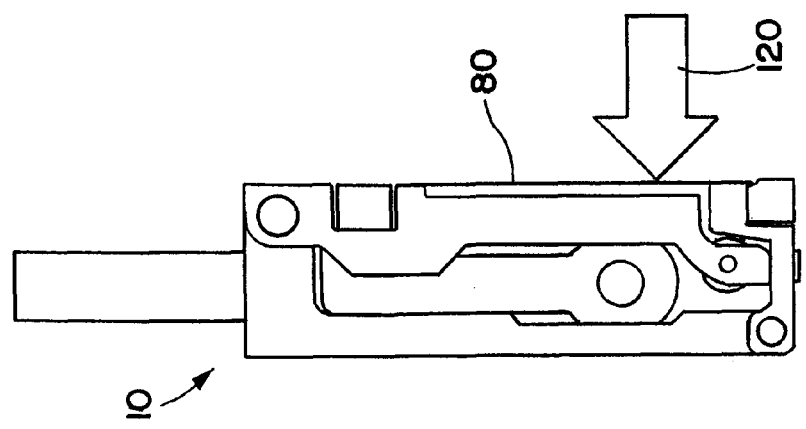

HEAT-ACTUATED RELEASE MECHANISM

BACKGROUND OF THE INVENTION

1. Field of the Invention

The invention is in the field of mechanical release mechanisms.

2. Description of the Related Art

Many situations require activation of a mechanism in response to heating, or in response to a condition that accompanies heating. Examples include pressure release for an overheating boiler, a fire in a storage area for munitions, or a fire or other pressure-increasing event within a storage container. Active actuation systems, for example with a powered actuator coupled to a temperature or heat sensor, have been tried in the past to detect and react to such events, but there are shortcomings in such approaches.

SUMMARY OF THE INVENTION

According to an aspect of the invention, a release mechanism includes: a first member; a second member; and a separable element mechanically coupled to the first member and the second member; wherein, the separable element separates when heated to a predetermined temperature, releasing the first member from the second member, and separating the first member from the second member.

According to another aspect of the invention, a containment system includes: a container; a lid on the container; and one or more release mechanisms that couple the lid to the container; wherein the one or more release mechanisms release when heated to a predetermined temperature.

According to yet another aspect of the invention, a method of releasing a mechanical coupling includes: providing a first member of the coupling; providing a second member of the coupling; and separating a separable element of the coupling when heated to a predetermined temperature, thereby releasing and separating the first member from the second member.

According to still another aspect of the invention, a release mechanism includes a separable plastic element that separates when heated, releasing the mechanism.

According to a further aspect of the invention, a release mechanism includes a breakable shape memory alloy element.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 3 is a cross-section view of a first step in release of the release mechanism of FIG. 1.

FIG. 4 is a cross-section view of a second step in release of the release mechanism of FIG. 1.

FIG. 5 is a cross-section view of a third step in release of the release mechanism of FIG. 1.

FIG. 6 is a schematic view of an alternate embodiment system that includes a release mechanism.

DETAILED DESCRIPTION

A release mechanism passively releases a mechanical coupling as a result of a temperature rise, and the mechanical coupling includes a tendon (first part) and a tendon retainer (second part). The release mechanism includes a breakable element, such as a shape memory alloy (SMA) element, that is configured to break when the element is heated to a predetermined temperature. The breakage of the breakable element releases a mechanical coupling, such as a coupling holding a lid onto a container. The release mechanism may be part of a handle or other device to close the container. The release mechanism may have a mechanical load on it prior to release, a load that in part passes through the breakable element. Most of the load may pass through one or more other members of the release mechanism, providing the force for separation after the release mechanism is triggered. The release mechanism may be used to provide a passive way of releasing a mechanical coupling in response to some sort of heating.

Figure 1:
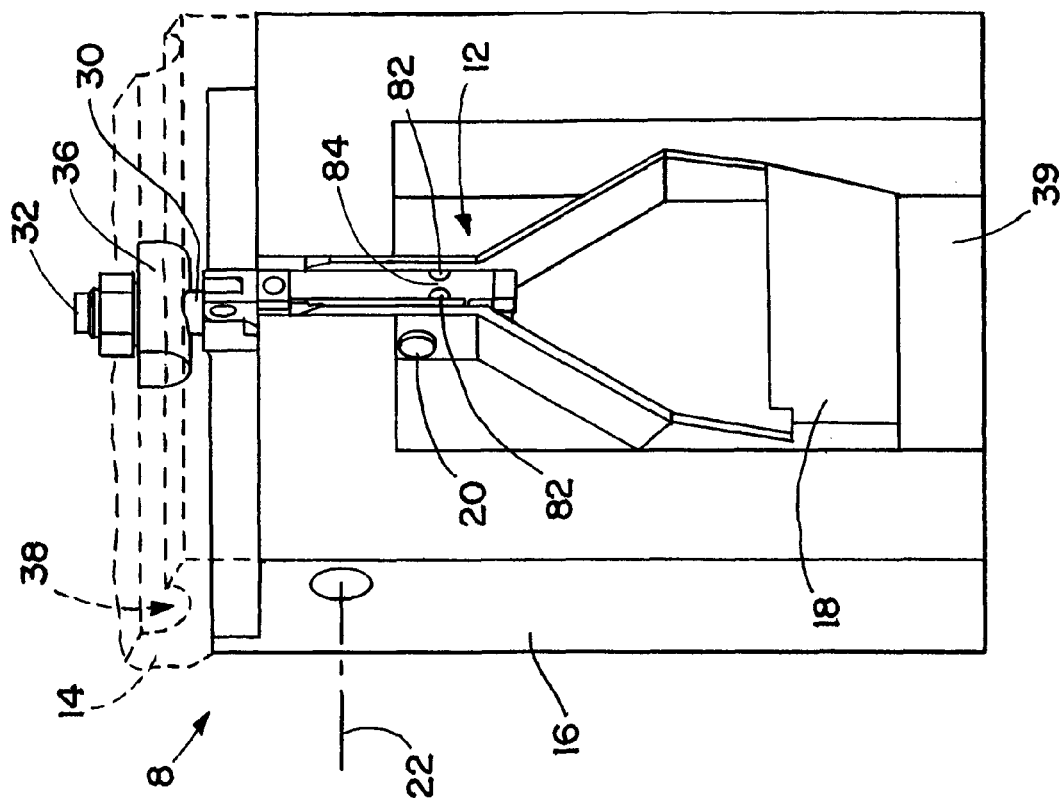
FIG. 1 is an oblique view of part of a system that includes a release mechanism in accordance with an embodiment of the present invention.

FIG. 1 shows part of a containment system 8 that includes a release mechanism 10 that is part of a handle 12 for closing a lid 14 of a container 16, and for mechanically securing the lid 14 to the container 16. The handle 12, which may be part of the container 16 and/or the lid 14, is used to secure the lid 14 by pivoting relative to the lid 14 and the container 16. The container 16 may be a rectangular box, or more generally a container of any suitable shape. Multiple of the handles 12 may be located around a perimeter of the container 16, to secure the lid 14 to the container 16 at multiple locations.

A grip portion 18 of the handle 12 is coupled to the release mechanism 10 with a pin 20, which allows the release mechanism 10 to pivot relative to the grip portion 18. The grip portion 18 is in turn pivotally coupled to the container 16, allowing the grip portion 18 to pivot about a pivot axis 22 in the container 16.

The release mechanism 10 includes a stud 30 that has a threaded shaft 32, with a half-barrel nut 36 threaded onto it. The half-barrel nut 36 engages a corresponding curved recess 38 in the lid 14. When the handle 12 is engaged by rotating the grip portion 18 into a recess 39 in the container 16, the nut 36 is pulled down against the top of the lid 14. This pulls the lid 14 tight against the container 16, with a force running through the handle 12 while the handle 12 is engaged.

The container 16 may enclose any of a variety of items. In one embodiment, the container 16 encloses rocket motors, or devices containing rocket motors. One issue with storing rocket motors is providing protection against explosion, should the fuel in any of the rocket motors begin to burn. If the container 16 remains closed then pressure can build up, possibly triggering an explosion. The risk of a catastrophic outcome is greatly reduced if the pressure build-up can be relieved, for example by allowing the lid 14 to at least partially separate from the container 16. Therefore the release mechanism 10 is configured to separate the handle's mechanical connection when sufficient heat is applied to the release mechanism 10. Whether the rocket motors burn in a slow cook or fast cook process, heat is generated which heats the container 16 and the handle 12. This heating can be used as a passive trigger to release the lid 14 from the container through the release mechanism 10. The release mechanism 10 advantageously does not require any active sensors or power to trigger the release of the lid 14 from the container 16.

Figure 2:
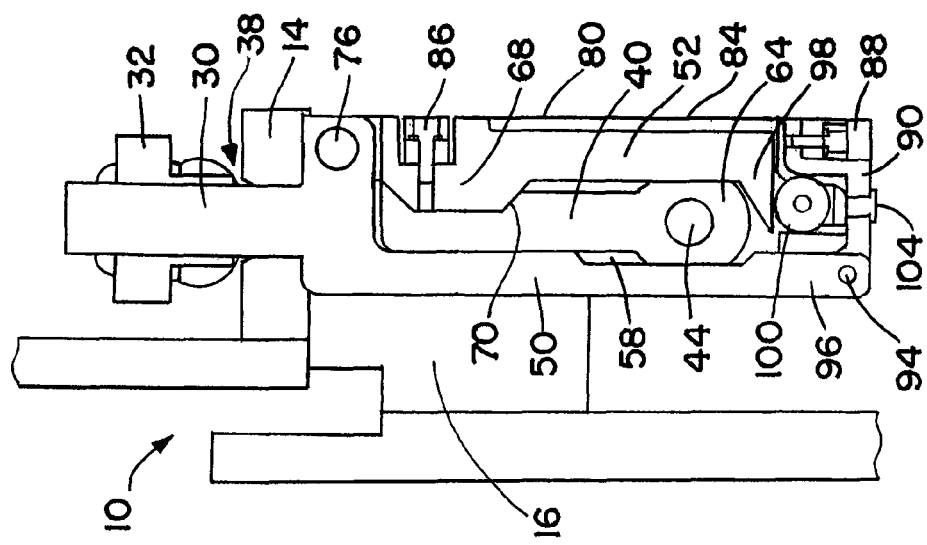
FIG. 2 is a cross-section view of the release mechanism of FIG. 1.

Referring now in addition to FIG. 2, the release mechanism 10 includes a tendon 40 that is connected to the handle grip portion 18 (FIG. 1). The tendon 40 has a hole 44 that receives the pin 20 (FIG. 1) coupling together the tendon 40 and the grip portion 18. The pin connection 20 allows for pivoting between the tendon 40 and the grip portion 18.

When the release mechanism 10 is intact (prior to release), the tendon 40 is between an inner member 50 and a tendon retainer 52. The inner member 50 is a continuous monolithic piece that includes the stud 30 that receives the half-barrel nut 36 (FIG. 1). As an alternative, the inner member 50 may be in multiple pieces. The member 50 has a recess 58 on its inner surface 60. The recess 58 receives a portion 64 of the tendon 40, the same portion of the tendon 40 that has the pin-receiving hole 44. The tendon retainer 52, on the opposite side of the tendon 40, includes a protrusion 68 that engages a corresponding recess 70 in the tendon 40. The engagement of the tendon 40 by the tendon retainer 52 prevents the tendon 40 from sliding out of engagement within the release mechanism 10. The engagement also helps transmit loads within the release mechanism 10.

The tendon retainer 52 is able to pivot relative to the inner member 50 at a joint 76 between the two. The joint 76 allows the tendon retainer 52 to rotate relative to the inner member 50 when the release mechanism is released, to allow the tendon 40 to escape from between the inner member 50 and the tendon retainer 52. When the mechanism 10 is released, the inner member 50 and the tendon retainer 52 remain coupled to the lid 14 (FIG. 1), and the tendon 40 remains with the container 16 (FIG. 1). As explained in greater detail later, the release of the mechanism 10 allows the lid 14 to at least locally separate from the container 16. This may allow release of pressure that may have built up within the container 16, and may aid in preventing further pressure build up in the container 16.

The release mechanism 10 also includes a separable element 80 that breaks or otherwise separates when heated, in order to release the engagement of the parts of the mechanism 10. The separable element 80 in the illustrated embodiment is a shape memory alloy element that is configured to break when heated. The element 80 has a pair of indentations or notches 82 (FIG. 1) that reduce the width of the element 80 at a given separation location 84 (FIG. 1). The reduction in width produces a weak point in the element 80, where the element 80 would preferentially break. The notches 82 are shown as semi-circles, but alternatively may be any of a variety of other shapes. Other types of preferential weakening are also possible, including scoring, thinning, and local changes in material composition and/or other characteristics.

The separable element 80 is secured at opposite ends by a pair of clamps 86 and 88. The upper clamp 86 secures the upper end of the element 80 to the tendon retainer 52. The lower clamp 88 secures the lower end of the element 80 to a hinged load reduction latch 90. The clamps 86 and 88 may be metal blocks that are screwed or bolted (or otherwise fastened) onto the tendon retainer 52 and the load reduction latch 90, respectively. The separable element 80 may be folded over or otherwise engaged with the clamps 86 and 88, to locally increase the strength of the separable element 80 in the vicinity of the clamps 86 and 88, to avoid having the separable element 80 be locally weakened in the vicinity of the clamps 86 and 88.

The latch 90 aids in retaining the mechanism 10 together, prior to release by separation (severing) of the separable element 80. The latch 90 is coupled to the inner member 50 by a pin 94, at a lower end 96 of the inner member 50. This allows the latch 90 to rotate relative to the inner member 50, about the pin 94. Prior to release of the mechanism 10, the latch 90 fits around a lower end 98 of the tendon retainer 52. This keeps the tendon retainer lower end 98 held against the inner member lower end 96. The tendon retainer lower end 98 has a roller 100, which presses against the latch 90 prior to release of the mechanism 10. The roller 100 aids in allowing movement between the tendon retainer 52 and the latch 90, when the mechanism 10 is released. As an alternative, the roller 100 may be omitted if desired.

The mechanism 10 is loaded when the handle 12 (FIG. 1) is closed, providing a force to hold the lid 14 (FIG. 1) against the top of the container 16 (FIG. 1). The load also provides a mechanical force to separate the lid 14 from the container 16 when the mechanism 10 is released. There is a load path passing through the mechanism 10, through the tendon retainer 52. The path through the tendon retainer 52 also puts a tension load on the separable element 80. It is desirable to provide enough load on the separable element 80 so that the separable element 80 is in tension, but to avoid overloading the separable element 80 in tension, since overloading could cause undesired separation, which would result in release of the mechanism 10. Therefore some of the load (e.g., less than half of the load) on the mechanism 10 may be directed through the separable element 80. The release mechanism 10 has a separable element tensioner 104 that is used to control the tension in the separable element 80. The tensioner 104 is a set screw that engages a threaded hole in the latch 90, to allow a tip of the set screw to press against an end surface of the tendon retainer 52. Turing the set screw positions the latch 90 relative to the tendon retainer 52, adjusting the tension in the separable element 80.

The separable element 80 may be made of any of a variety of materials that exhibit shape memory properties, such as shape memory alloys. Shape memory alloys undergo a temperature related phase change that is characterized by the memory of a mechanical configuration imposed on the material at an annealing temperature. When the shape memory alloy is below some lower temperature, the alloy possesses a particular crystal structure whereby it may be deformed into an arbitrary shape with relative ease. Upon heating the alloy above a higher temperature, the alloy undergoes a change in crystal structure and the shape memory effect is manifested by a resumption of the originally imparted shape, representing the onset of a restoring stress. Further details regarding the behavior of shape memory materials may be found in co-owned U.S. Patent Pub. 2010/0139264, which is incorporated herein by reference in its entirety. Examples of suitable shape memory alloys include nickel-titanium alloys (e.g., Nitinol), titanium-nickel alloys, copper-zinc-aluminum alloys, copper aluminum nickel alloys, nickel titanium hafnium alloys, and other shape memory alloys.

The separable element 80 may be imparted with a "remembered" set shape that is far different from the shape it later has when installed in the release mechanism 10. In installing the element 80 in the release mechanism 10, the element 80 may be element stretched or strained from its original shape. When the separable element 80 is heated, such as from slow or fast combustion of external environmental elements, the separable element 80 undergoes a force as it tries to contract or otherwise return to its remembered set shape. This puts a stress on the separable element 80. With the indentations or notches 82, this stress causes the separable element 80 to break at the weakened location 84. The dimensions and other characteristics of the separable element 80, and of its indentions or notches 82, and its weakened location 84, may be selected to achieve breakage of the element 80 (and release of the mechanism 10) when heating occurs that is associated with a desired release of the mechanism 10. For example, combustion of the item or items in the vicinity of the container 16 will be expected to cause a certain amount of heating, and the element 80 may be configured to release the mechanism 10 when an amount of heating occurs that is associated with a need to provide some pressure release by loosening the lid 14.

The separable element 80 alternatively may include another sort of material, a material that separates by a different mechanism. For example the separable element 80 may be a plastic material that melts or weakens when heated. This melting or weakening results in breaking or otherwise separating of parts of the plastic element, releasing the mechanism 10. A plastic material for the separable element 80 may be selected to achieve release of the mechanism at a desired heating.

The other parts of the mechanism (and the container 16 and the lid 14) may be made of any of a variety of suitable materials. Suitable stainless steel is an example of a suitable material.

FIG. 3-5 illustrate release of the mechanism 10. FIG. 3 shows the separable element 80 being heated, as shown at 120. The heating may be by any of a variety of mechanisms, such as by conduction through the mechanism 10, or by radiation or convention from the container 16 (FIG. 1) or the surrounding environment.

FIG. 4 shows the mechanism 10 immediately following separation of the element 80. The latch 90 and the tendon retainer 52 separate from one another, each rotating relative to the inner member 50. The roller 100 on the tendon retainer 52 helps prevent binding between the tendon retainer 52 and the latch 90.

The rotation continues until the tendon retainer 52 becomes fully disengaged from the tendon 40, as illustrated in FIG. 5. The inner member 50, the tendon retainer 52, and the latch 50 are all pulled upward, along with the lid 14 (FIG. 1). These parts of the mechanism 10 become separated from the tendon 40, which remains coupled to the container 16 (FIG. 1). The separation of the parts of the mechanism 10 allows the lid 14 to become mechanically decoupled from the container 16, at least locally where the handle 12 (FIG. 1) provide part of that coupling.

The release mechanism 10 described above is only one possible application. FIG. 6 schematically shows a generalized system 200 in which a release mechanism 210 couples together a pair of members 212 and 214. The mechanism 210 may have some of the same characteristics as the mechanism 10 (FIG. 1) described above. For instance the mechanism 210 may have a separable element that is similar in configuration and function to the separable element 80 (FIG. 2). However, other parts of the mechanism 210 may have a different configuration as to how the mechanism 210 is held together prior to release, and to how the parts of the mechanism 210 release from one another after separation of the separable element.

The members 212 and 214 may be any sort of parts or devices that change position and/or function (or other characteristics) when the release mechanism 210 is released. To give one example, one or both members 212 and 214 may be parts of a boiler or other device that would benefit from release or pressure (or other change in operation) when overheating. In such a situation the release of the mechanism 210 may trigger opening of a relief mechanism, such as a venting door, to relieve pressure within the boiler or other device.

In another example, release the mechanism 210 may cause closing of one or more fire doors that may be, or may be coupled to, the members 212 and 214. Heating from a fire may release the mechanism 210, resulting directly or indirectly in closing the fire doors.

The mechanisms 10 and 210 have the advantage of being passive devices actuated by heat. No power is required for operation of the release mechanisms, nor is there any need for a temperature or other sensor.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A containment system comprising:
    a container;
    a lid; and
    a device for pulling the lid against the container to close the container, and for mechanically securing the lid to the container;
    wherein the device includes a release mechanism that includes a separable element for passively releasing a mechanical coupling within the device, the mechanical coupling being different from the separable element, wherein the mechanical coupling couples together a first part of the release mechanism and a second part of the release mechanism; and
    wherein the separable element breaks when heated to a predetermined temperature, passively releasing the mechanical coupling that couples together the first part and the second part, thereby allowing the lid and the first part of the release mechanism to separate from the container and the second part of the release mechanism.

2. The containment system of claim 1, wherein the separable element is a shape memory alloy element.

3. The containment system of claim 1, wherein the separable element has a weakened portion at which the separable element preferentially breaks.

4. The containment system of claim 1,
    wherein the device is a handle that is rotatably coupled to the container; and
    wherein the release mechanism is part of the handle.

5. The containment system of claim 1, as part of a pressure release system or a fire safety door.

6. The containment system of claim 1, wherein some of a load through the release mechanism, to hold the lid against the container, passes through the separable element.

7. The containment system of claim 1, wherein less than half of a load through the release mechanism, to hold the lid against the container, passes through the separable element.

8. The containment system of claim 1, wherein the device for pulling the lid against the container to close the container, pivots relative to the lid and the container to secure the lid to the container.

9. The containment system of claim 8, wherein the device for pulling the lid against the container is a handle.

10. The containment system of claim 2, wherein the shape memory allow includes one or more of a nickel-titanium alloy, a titanium-nickel alloy, a copper-zinc-aluminum alloy, a copper aluminum nickel alloy, and a nickel titanium hafnium alloy.

11. The containment system of claim 2, wherein heating of the shape memory alloy element causes a stress in the shape memory alloy that causes breakage of the separable alloy when sufficient heating has been achieved.

12. The containment system of claim 3, wherein the separable element has one or more indentations adjacent to the weakened portion, that provide a reduced cross section to the weakened portion.

13. The containment system of claim 4,
wherein the second part includes a tendon that is rotatably coupled to the container; and
wherein the first part includes a first member and a tendon retainer, with the tendon held between the first member and the tendon retainer, prior to separation of the release mechanism.

14. The containment system of claim 13, wherein the tendon retainer is rotatably coupled to the first member.

15. The containment system of claim 13, further comprising a latch that is rotatably coupled to the first member.

16. A containment system comprising:
a release mechanism including:
a first member;
a second member;
a latch that is rotatably coupled to the first member; and
a separable element mechanically coupled to the first member and the second member;
a container; and
a lid;
wherein, the separable element breaks when heated to a predetermined temperature, releasing the first member from the second member, and separating the first member from the second member;
wherein the release mechanism separably couples the lid and the container together as part of a device to close the container;
wherein the second member includes a tendon that is rotatably coupled to the container;
wherein the release mechanism further includes a tendon retainer, with the tendon held between the first member and the tendon retainer, prior to breakage of the separable element;
wherein opposite ends of the separable element are fixedly attached to the tendon retainer and the latch, respectively; and
wherein more of a load through the release mechanism, to hold the lid against the container, passes through the tendon retainer than through the separable element.

17. The containment system of claim 16, wherein the release mechanism includes element clamps to clamp the element to the tendon retainer and the latch.

18. The containment system of claim 16, wherein the release mechanism includes a tensioner that controls the load that passes through tension retainer.

19. The containment system of claim 18, wherein the tensioner includes a set screw that engages a threaded hole through the latch, with a tip of the set screw in contact with the tendon retainer.

20. A containment system comprising:
a release mechanism including:
a first member;
a second member;
a latch that is rotatably coupled to the first member; and
a separable element mechanically coupled to the first member and the second member;
a container; and
a lid;
wherein, the separable element breaks when heated to a predetermined temperature, releasing the first member from the second member, and separating the first member from the second member;
wherein the release mechanism separably couples the lid and the container together as part of a device to close the container;
wherein the second member includes a tendon that is rotatably coupled to the container; and
wherein the release mechanism further includes a tendon retainer, with the tendon held between the first member and the tendon retainer, prior to breakage of the separable element; and
wherein the tendon retainer includes a roller that is in contact with the latch.

* * * * *